United States Patent [19]
Weber

[11] 3,793,933
[45] Feb. 26, 1974

[54] COFFEE INFUSION APPARATUS AND METHOD

[76] Inventor: Robert L. Weber, 49 Clapboard Rd., New Canaan, Conn. 06840

[22] Filed: Nov. 19, 1971

[21] Appl. No.: 200,300

[52] U.S. Cl. .................................. 99/283, 99/302
[51] Int. Cl. ........................................ A47j 31/24
[58] Field of Search ....... 99/280, 281, 282, 283, 71, 99/292, 300, 302, 307

[56] References Cited
UNITED STATES PATENTS

| | | | |
|---|---|---|---|
| 1,916,369 | 7/1933 | Harpster | 99/282 |
| 3,405,630 | 10/1968 | Weber | 99/286 |
| R25,663 | 10/1964 | Bunn | 99/282 |
| 2,346,389 | 4/1944 | Peters | 99/282 |
| 2,615,384 | 10/1952 | Ranz | 99/282 |
| 3,423,209 | 1/1969 | Weber | 99/71 |

Primary Examiner—Robert W. Jenkins
Attorney, Agent, or Firm—Cooper, Dunham, Clark, Griffin & Moran

[57] ABSTRACT

A coffee infusor consisting of a self-contained appliance providing for filtering water to purify and condition it before or after heating, heating it in a closed container to generate pressure to move it, controlled communication from the closed heating chamber to a coffee infusion chamber for timed infusion, where the heated water is contacted with coffee grounds and passed from the infusion chamber to a receptacle to collect the finished coffee infusion.

5 Claims, 24 Drawing Figures

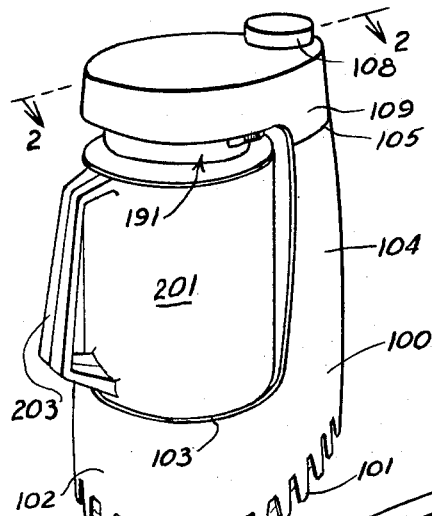
FIG.1
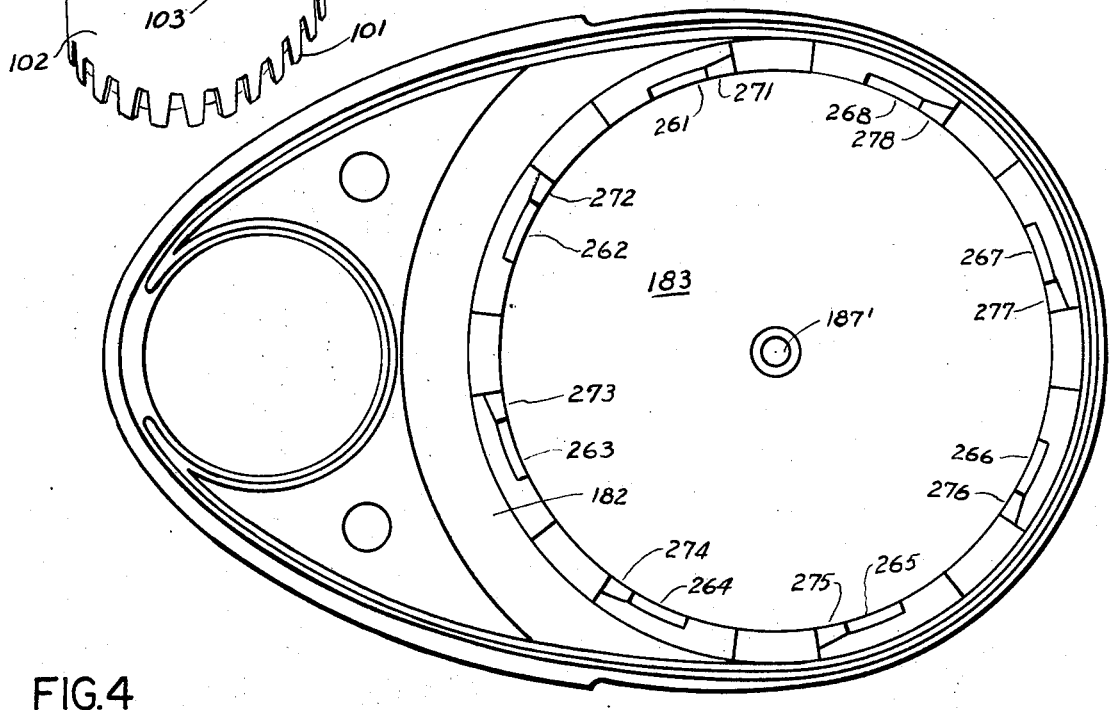
FIG.6
FIG.4
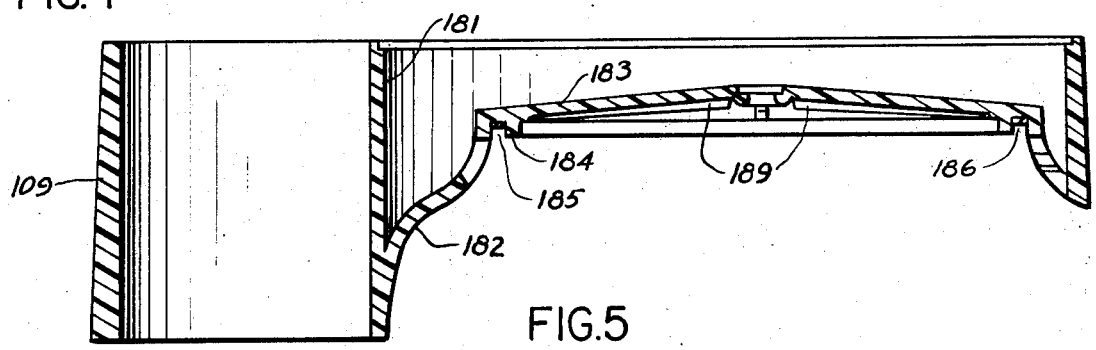
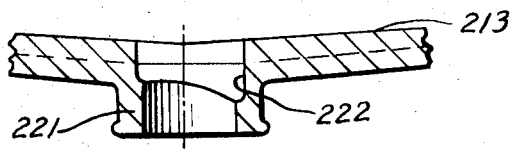
FIG.5
INVENTOR.
ROBERT L. WEBER

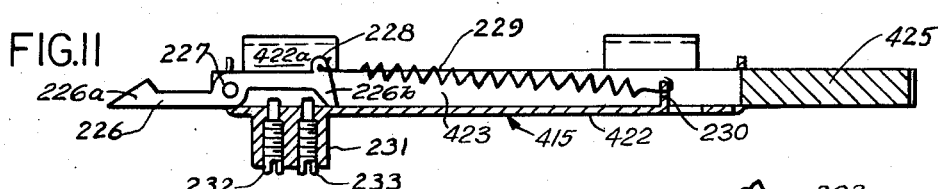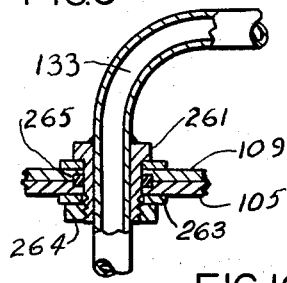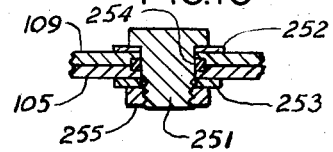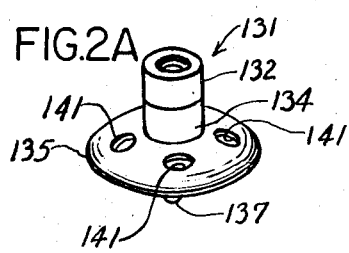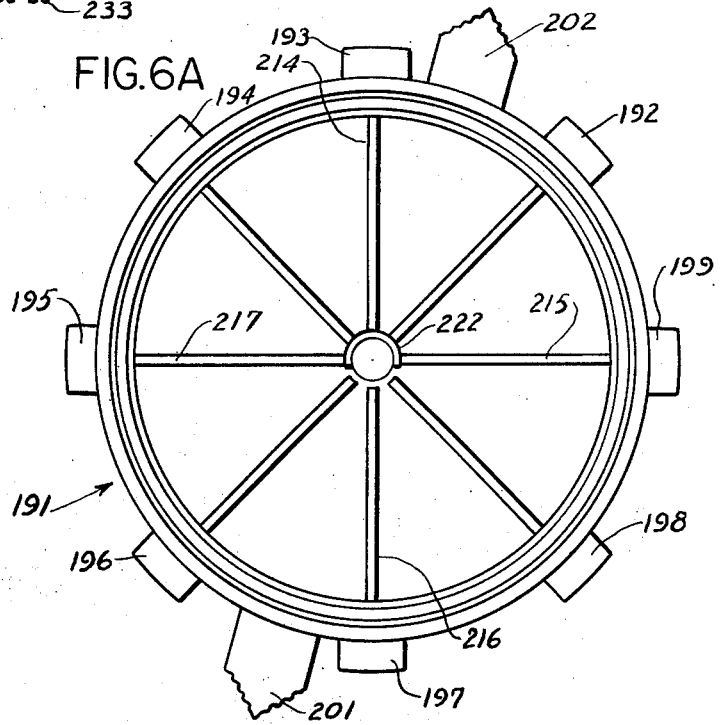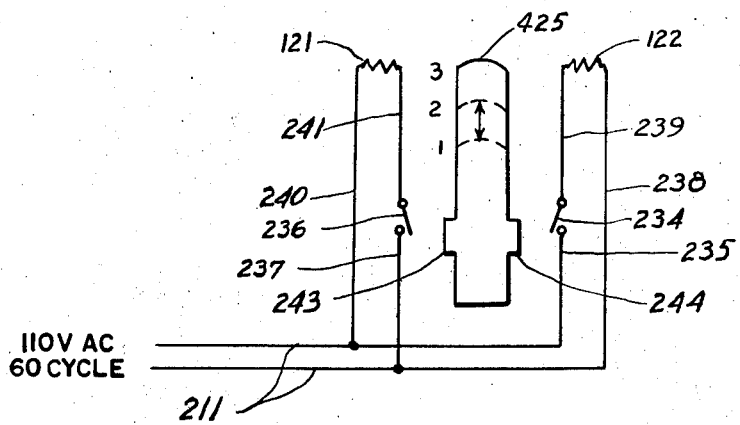

INVENTOR.
ROBERT L. WEBER
ATTORNEY

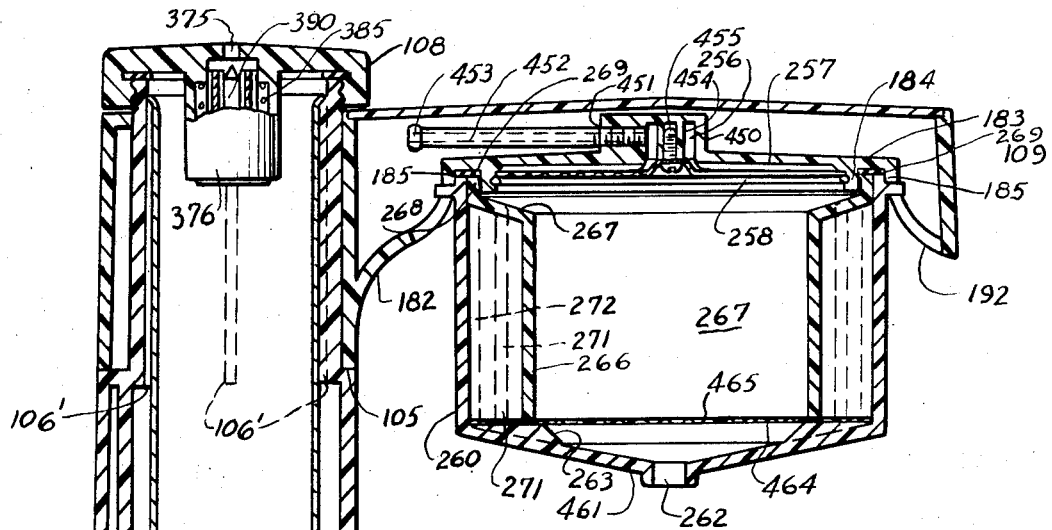
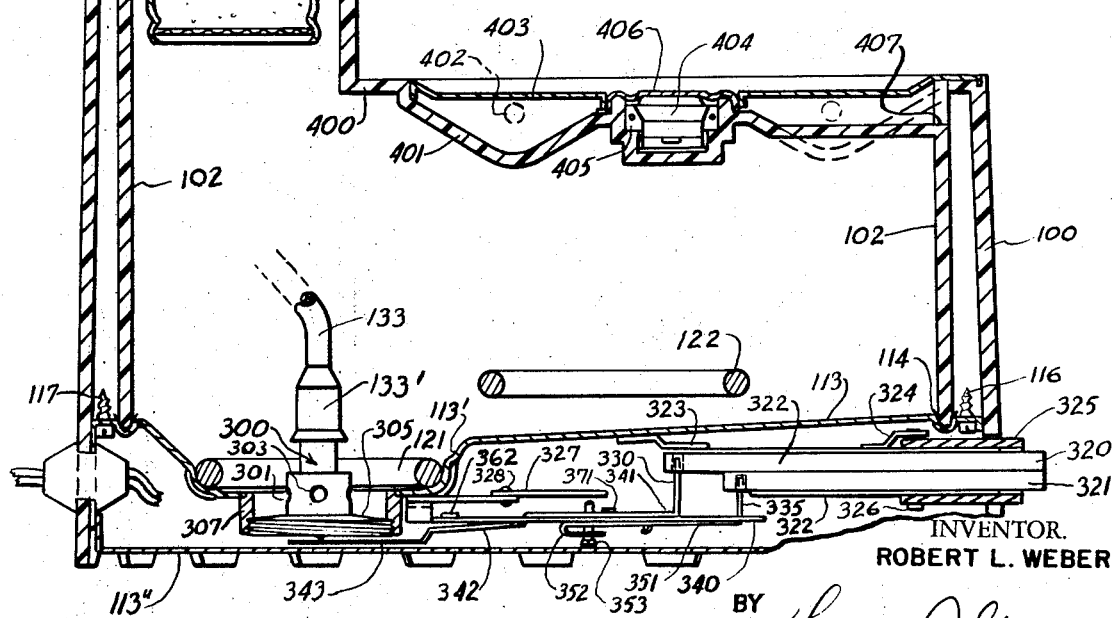
FIG.12

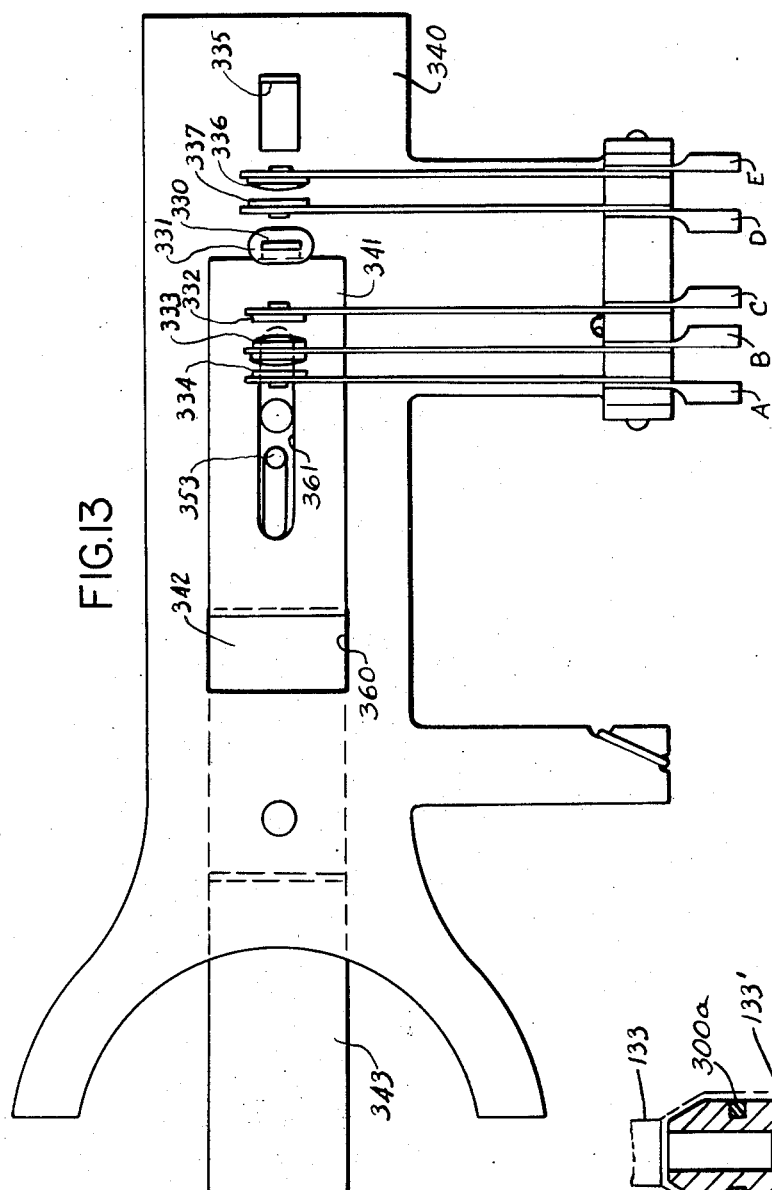
FIG.13
FIG.14
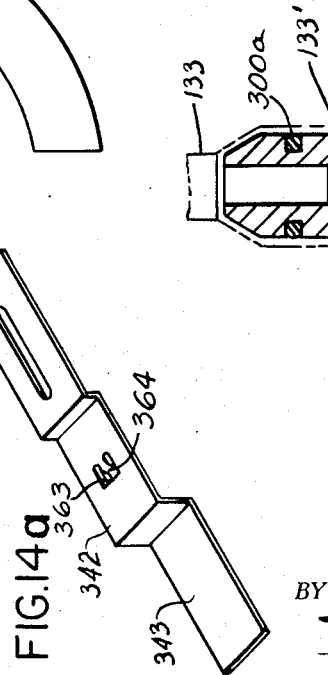
FIG.14a
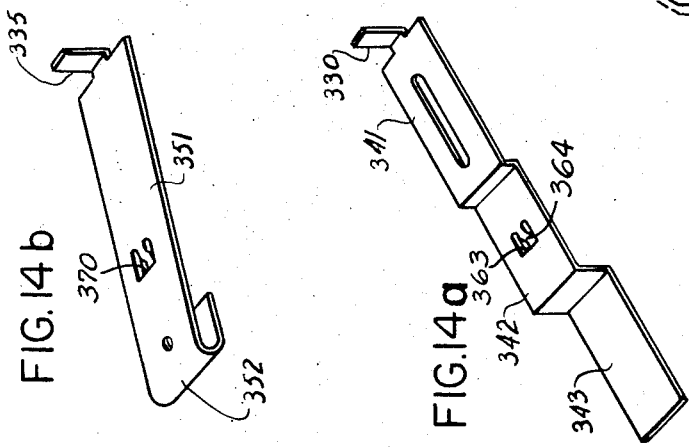
FIG.14b
INVENTOR.
ROBERT L. WEBER
BY
ATTORNEY

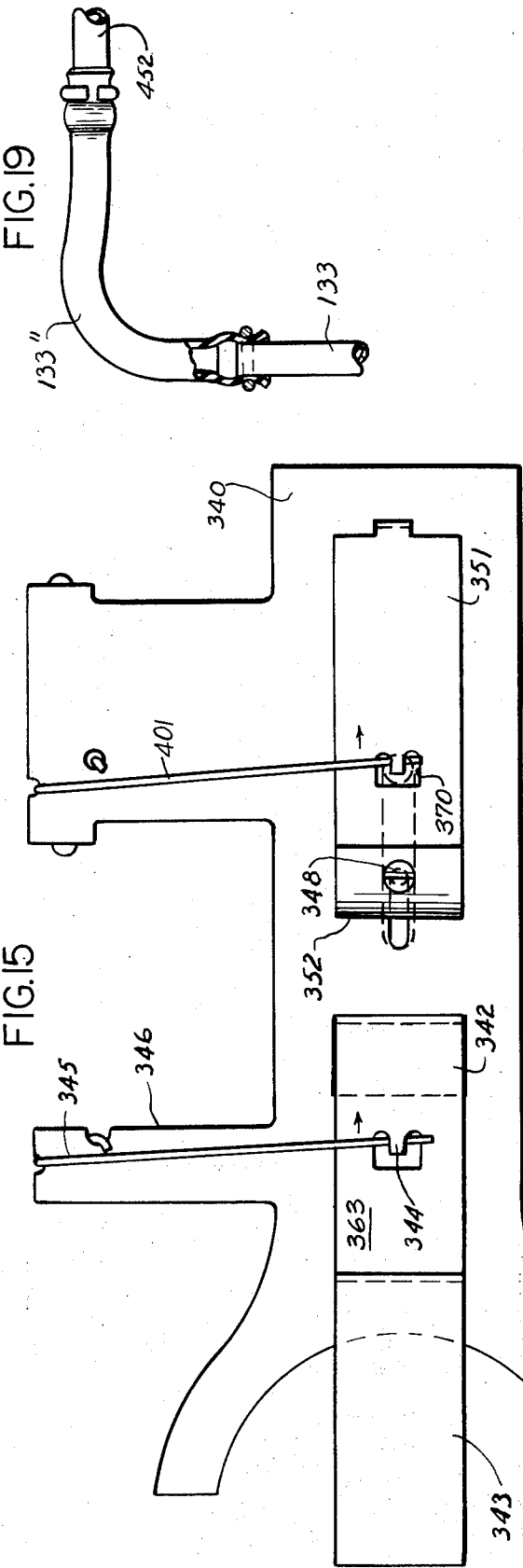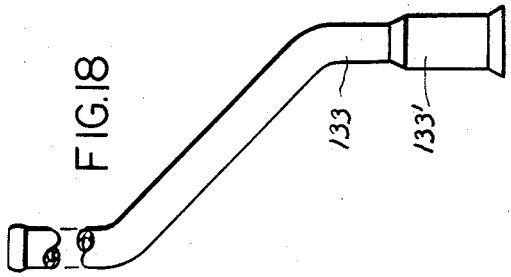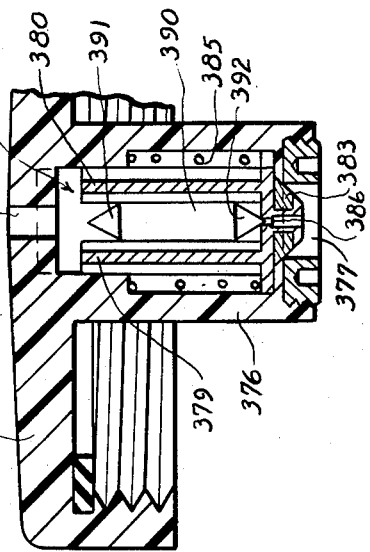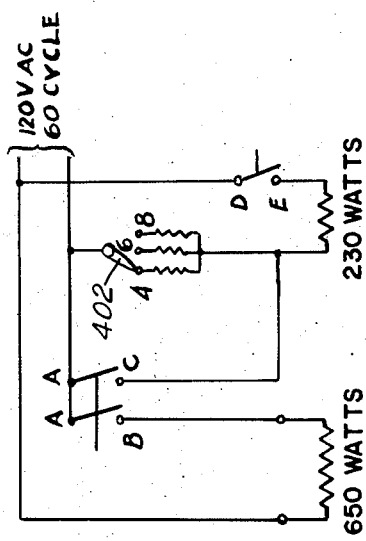

COFFEE INFUSION APPARATUS AND METHOD

BACKGROUND OF THE INVENTION

In my prior patents U.S. Pat. No. 3,405,630, issued Oct. 15, 1968, U.S. Pat. No. 3,361,052, issued Jan. 2, 1968, U.S. Pat. No. 3,423,209, issued Jan. 21, 1969, and U.S. Pat. No. 3,518,933, issued July 7, 1970, I have described coffee makers with various attributes which aim for achievement of the objective of obtaining optimally infused coffee. There are 21 identified defined variables in the making of a coffee infusion and, where the product, that is coffee infusion, is as delicate and sensitive to flavor deterioration as a fine wine, it is important that attention be paid to details in the making of the coffee infusion. Optimized temperature of infusion is highly desirable and this is identified as being in the range of 195°F ± 5°F. (90.5°C ± 3°C). Protection of the infusion and the grounds from oxidation, while they are in contact with each other, is another important variable. Hence, submergence of coffee grounds in water and a single pass through the coffee grounds, away from oxygen, is a desired objective.

As a basis of reference I use the publication of the Coffee Brewing Institute identifying its standards, objective and subjective, for the measurement and evaulation of the properties of a good cup of coffee. Reference may be had to its literature, particularly its standards for the preparation of aqueous infusion of coffee.

It should be understood that in aiming to achieve optimal brewing of coffee, my apparatus is concerned with the manipulative process variables and is not concerned with the condition of the bean itself. This involves an independent group of variables which is determined by the quality of the raw bean, its ripening, its treatment in the course of progress from the coffee bush to the product which appears on the market, and the technique used in the roasting.

It is, accordingly, a basic object of this invention to provide an apparatus suitable for the consistent preparation of an aqueous infusion of coffee with optimized flavor of the infusion, using an appliance which is a self-contained unit, putting under automatic control certain of the variables which can be put under control, other than the nature and quality of the bean itself.

It is a further object of the invention to provide an appliance in a form suitable for ordinary domestic use, but, nevertheless, in a capacity such that it can be made larger or smaller for very nominal use or enlarged domestic use, the unit being such that the variables of water temperature, temperature of extraction, time of extraction, and the protection of ground coffee bean from oxidation during extraction, are set and not subject to abuse by the user of the apparatus.

It is another object of the invention to provide a unit, having a self-contained capacity for correcting one of the major sources of poor flavor in coffee infusions, namely the water itself the correction being in the form of a filter unit suitable to remove foreign ingredients from the water which is used for the preparation of the infusion.

Other objects and advantages of the invention will, in part, be obvious and in part will appear hereinafter.

DETAILED DESCRIPTION OF THE INVENTION

The invention accordingly is embodied in an apparatus, and in the corresponding method, which comprises a self-contained unit consisting of four identifiable major components, namely, a base including a water heating chamber, a top, a coffee infusion chamber, and water conditioner, the parts being coordinated into a whole, such that the base carrying the filter-water-conditioner contains the water reservoir, heater, temperature control, and the top receives the water conduit and carries means for supporting the infusor, the infusor being equipped to carry an appropriate amount of ground coffee beans for extraction and developed so as to enclose the grounds away from air, permit submergence in water and restrict flow of the water therethrough to develop a controlled timed infusion. The bottom of the appliance is the base which contains the several controls for heating the water, releasing it at the appropriate time, and communicating with the coffee infusor via a conduit in a closed system, the infusor being mounted in the top and in position to discharge the infusion at a controlled rate through a controllable orifice into the receptacle for the finished product.

The invention, accordingly, is embodied in the apparatus and the method which embodies the infusion of coffee involving the combination of elements and arrangement of parts in the apparatus to be described, and in the method which involves the sequence of steps and coombinations of steps and control and adjustment of variables, hereinafter to be described in greater detail.

Referring now to the drawings,

FIG. 1 is an overall perspective rendition of the completed unit showing the receptacle in place for receiving product with the coordinated parts in the form of an appliance, such as is suitable for use in domestic brewing of coffee;

FIG. 2A is a perspective view of a control valve in the apparatus of FIG. 2;

FIG. 4 is a detailed sectional view of the skeleton of the top piece showing the relationship of the several parts to each other;

FIG. 5 is a detailed view of the discharge orifice of the coffee infusion chamber itself;

FIG. 6 is a plan view of the head and quick turn-on support for the coffee infusion chamber;

FIG. 6A is a plan view of the coffee infusion chamber.

FIG. 8 is a diagram of an electrical circuit for use with the appliance.

FIG. 9 is a section vertically showing a bushing providing a connection for a water tube in the appliance.

FIG. 10 is a section vertically showing a connection of a head to a base in the appliance.

FIG. 11 is an enlarged view of the control switch.

FIG. 12 is a section vertically through a model of the apparatus showing a second embodiment similar to that shown in section in FIG. 2, wherein the coffee infusion chamber, top safety valve, and heating arrangement in the base have been modified to a preferred version;

FIG. 13, 14 a and b and 15 are coordinated to show the mechanical details of the structure of the switch;

FIG. 13 being a plan view thereof; FIG. 14 a longitudinal section; FIG. 14a a perspective of one slide; FIG. 14b a perspective of a second slide; and FIG. 15 a bottom plan view.

FIG. 16 is a diagram of the electric circuit used in the base of the device.

FIG. 17 is an enlarged showing of the structure of the safety pressure relief valve formed as part of the top;

FIG. 18 is a showing of the water discharge tube to take water from the heating chamber up through the column and to the infusion chamber.

FIG. 19 shows a flexible connection between a relatively rigid water discharge tube for the heating chamber and a relatively rigid inlet tube leading to the infusion chamber.

Figure 2:
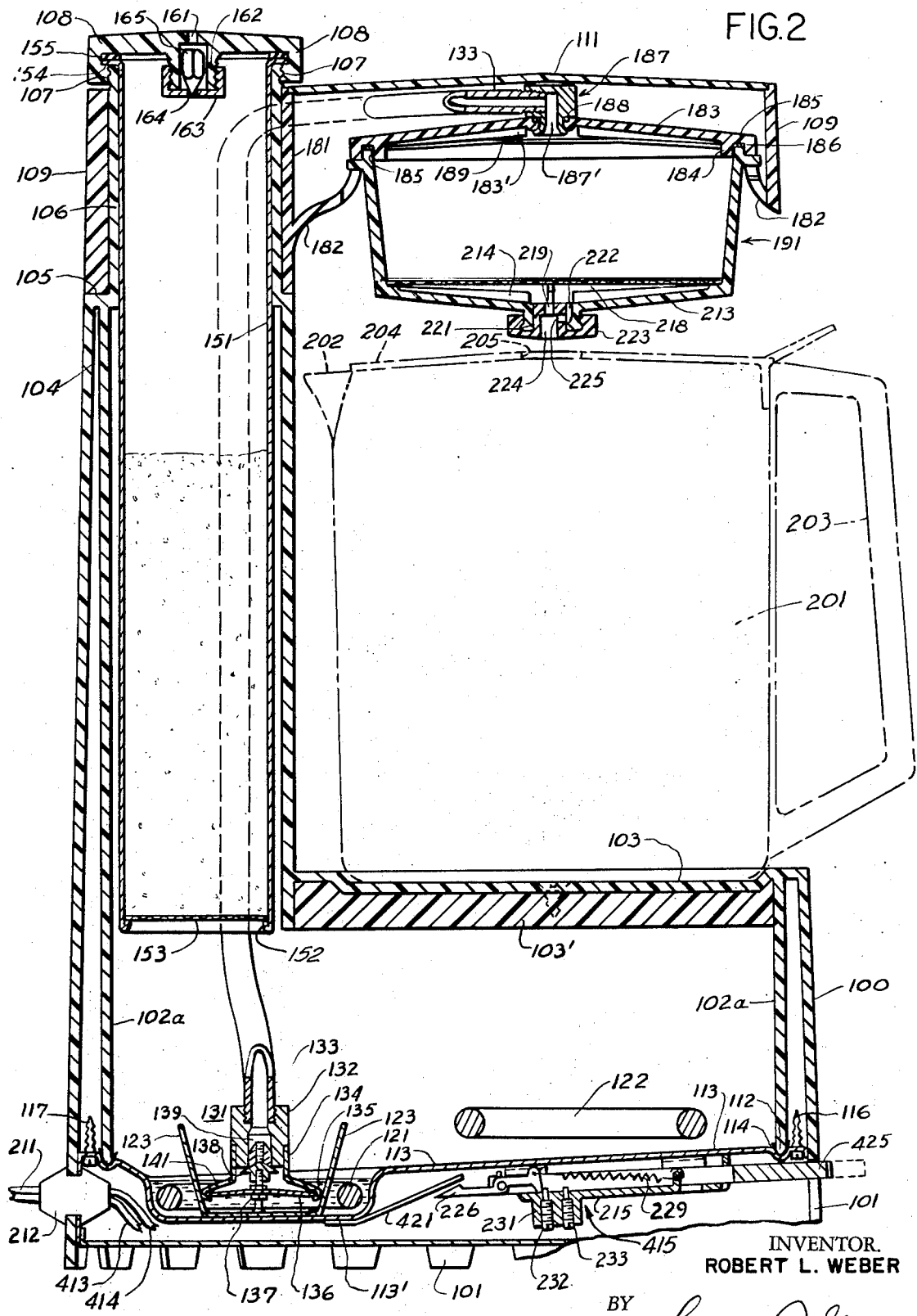
FIG. 2 is a section through FIG. 1, longitudinally, essentially centrally along line 2—2, showing the several parts of the apparatus in their coordinated relationship.

Referring now to FIG. 1 and 2, the appliance consists of a base 100 formed with a generally elliptical outline and, in this illustration, shown with a serrated bottom edge 101 carried by a downwardly depending skirt 102, integrally formed with a recessed top 103, which in turn joins the integrally formed upstanding section 104 in the narrow end of the ellipse forming the base outline. This unit is formed thus, generally tapered upwardly and styled so that it can be of a plastic suitable for molding in a single operation.

As shown in vertical section in FIG. 2, the upstanding section 104 is formed with a ledge 105 near its upper end, from which it continues as section 106 to terminate in threads 107 and cap 108. Fitted onto the base, at the upstanding section thereof, is the head 109 again formed as a single integral piece. The head 109, is partially covered by top 111 which can be snap fit. This to provide access to the interior. The head 109 is also styled and shaped to slide fit on the upwardly extending column 104 of the support base 100 specifically the narrowed end 106 to rest on ledge 105 and form a continuous exterior line, preferably carrying upward the stylish shape given to the overall exterior of the unit.

As shown in FIG. 2 the base 100, in section, is seen to consist of a slightly upwardly tapered exterior shell 100 integrally molded with an internal wall 102a partly closed by the a top 103 which is recessed to provide a support on which a receptacle 201 for coffee can rest. Fins 13' are molded on the inside of top 103.

It will be seen that the lower edge 112 of the internal wall 102 a is curved and matched by the form of the edge of a base plate 113 which is formed with an edge-groove to conform and fit around the edge 112 of the wall and extend to the outer wall of the base 100. A sealant 114 preferably, Dow Corning 732RTV silicone rubber, is compressed between the edge 112 of the wall and the base plate 113 to provide a waterproof seal. The base plate 113 is held in place by a sequence of screws 116, 117, etc. The screws are set symmetrically around the circumference of the bottom and hold the base plate in place in a water-tight joint.

Base plate 113 is formed with a depression 113', therein, in which ring heater 121 is carried. A larger ring heater 122 is carried in the main body of water in the reservoir base of the container. The reason for the small heater and the depressed pan constituting a small reservoir is safety in providing a source of heat absorption for the ring heater 121.

The ring heater 121 and 122 are part of the electrical system which is separately described hereinafter.

Fixed to the inside surface of the depression 113' in the base plate 113 is a four-pronged retainer 123, which serves as a support for a control valve 131 (see FIG. 2A). One end of a coupling nut 132 is connected to a tubular discharge outlet 133. A retainer element 134, is closely fitted around the other end of the nut 132, and is formed with outwardly extending flange 135, having its periphery curved to receive a temperature responsive bimetallic disk 136, carrying an adjusting screw 137, which supports a valve 138 cooperating with a seat 139 formed in the coupling nut 132. Openings 141 are provided at quadrants around the circumference of the flange element 135 to permit water to pass through the valve. The temperature responsive disk 136 is set to snap sharply in a direction to open the valve 138 in response to water reaching the temperature of infusion which is sought and in the manfuacture of this unit, this metal snap valve will be set to respond sharply to a temperature of about 195°F.

Referring now to the upstanding section 104, it will be seen to include a single tubular member 151, having its bottom edge 152 rolled around the periphery of a stainless steel strainer 153, to form a filter base. The upper edge 154 is rolled or flared outwardly to match the curvature of the top edge of the upstanding tubular section 104. A gasket 155 is compressed between the cover 108, and the upper edge of tubular member 151, to form a water-tight seal. The outer circumference of the cap 108 can be knurled to permit simplified gripping thereof when it is screwed into or out of place.

Centrally in the cap 108 is an orifice 161 and within the cap is a downwardly depending cylindrical neck 162 aligned with the orifice and threaded to receive a stainless steel retainer 163. Orifice 164 in retainer 163 is carefully calibrated to match the weight of a valve 165, having a tapered conical end cooperating with the orifice, which acts as a safety valve. That is, should any failure in the heating system occur to produce overheated water, this is a simplified safety valve to release excess vapor pressure. It is preset for the vapor pressure of water at just below the boiling temperature, i.e., about 200°F., and working in conjunction with ring heater 121 maintains a constant vapor pressure during the extraction period.

Water connection is made from the control valve 131 to the infuser 191, through the tubular memmber 133, which is connected to the valve 131, at one end, conducted around the side of the filter chamber, and through the hollow head 109 to the infuser.

The filter chamber 151, which is enclosed in the water chamber, is filled with an appropriate filter material, generally activated charcoal is suitable, using granules about as finely divided as ground coffee. Its function in the device is to remove components from the water which adversely affect the flavor and aroma of coffee. Water is poured in through the top. In a single pass through the filter bed, chlorine, fluorine, iron, phosphates, and other chemicals are removed from the water. By including ion exchange resins, or deionizing resins, it is possible to condition the water and to have it completely free of any kind of chemical, whether naturally occurring or present as a pollutant; particularly it is possible and desirable to remove from the water, by this filter arrangement, the extraneous components to the point of making the water deionized. It should be conditioned to avoid interference with the flavor of the infusion.

The head of the unit which I have generally designated 109 is a single injection molded piece shown in additional enlarged detail in FIG. 4. Basically the head consists of the member 109 elliptical in periphery, integrally molded with an internal circular cylindrical section 181, which fits around section 106 as a support, the internal portion of the head 109 also having a curved, guide section 182. Guide section 182 is curved inwardly and upwardly to terminate in a low conical top section 183 which has a inner downwardly depending inner ring 184 molded therein to define with the guide section 182 a groove 185, in which a gasket 186 is seated. The top section 183 formed as part of the head is sealed at its open apex around a stainless steel fitting 187 with an O-ring seal 188, to provide a point of entry for the water from water inlet tube 133. Top section 183 has molded therein a set of several fins 183' to serve as spacers for a screen 189 and also as water spreaders.

The coffee basket or infusor, in section in FIG. 2, and in plan in FIG. 6A consists of the single molded unit 191, having slightly conically diverging sides with the sequence of lugs, 192, 193, 194, 195, 196, 197, 198, and 199, integrally molded into its body near the upper edge. This contour of infusor 191 is matched by the top section 183, where openings 261, 262, 263, 264, 265, 266, 267, 268, (FIG. 6) receive corresponding lugs and guide them into locking position with a quick turn of a small fraction of a circumference. Two lugs 201 and 202 on the side of infusor 191 are made enlarged to provide a manual grip. For close sealing of the coffee basket in place, gasket 186 is provided in the groove 185 in the head 109.

Within the coffee basket on its bottom 213 are molded ribs 214, 215, 216, 217, to the number it may be considered desirable to have, which support a steel screen filter 218. A paper filter may also be provided.

The oulet from the coffee basket is through an integrally molded nipple 221 (FIGS. 2 and 5) and a flexible plastic fitting 223, which may be molded of polyethylene or polypropylene, snap fitted on the nipple 221. The fitting 223 has a fixed central orifice 219 (FIG. 2) and a hydraulically parallel variable orifice comprising a laterally directed opening 225 providing fluid communication between a contoured recess 222 (FIG. 5) and a central opening 224 in the fitting 223. Orifice 219 also communicates with opening 224. The fitting 223 is rotatable in position on the nipple 221, so that orifice 225 in one position can see auxiliary space 222 to provide for extra flow, e.g., for six cups, and in the next position the orifice 225 can see space 222 to permit eight-cup-flow, under the pressure conditions for which the apparatus is set. That is, with a fixed total volume of apparatus, i.e., water chamber and coffee basket, it is important that the residence time of water in the coffee basket be kept approximately constant, whether the apparatus is used for full eight-cup volume, or six-cup volume or four-cup volume. This is done by maintaining constant pressure within the device but providing variable capacity for outflow. This of course is net outflow of coffee. The water measurement allows for that retained in reservoir 113' and the holdup in the coffee grounds in the coffee basket.

The water connection from valve 131 to the water basket at the top of the apparatus is made by tube 133 which, as indicated in dotted lines in FIG. 2, extends from valve 131 over to one side of the apparatus up through the hollow upstanding element 106, beside the filter, through an opening in the head 181, across to the fitting 187, to connect thereto within the head. The entire unit is covered by the top cover plate 111. Fitting 187 is essentially an elbow formed to receive water tube 133, and turn the water to a downward direction. Exit from fitting 187 is via orifice 187' which is slightly flared to receive O-ring 188, and form a snap fit with the head 183.

The coffee receptacle 201 consists of the container equipped with a pouring spout 202, handle 203, and cover 204, with an opening 205, to receive coffee discharged from the basket.

In the operation of making coffee, the appropriate volume of water is measured into the calibrated container 201, poured through the open top of section 106, from which cap 108 has been removed, to pass through the tubular member 151, and drain into the vessel defined by base plate 113 and wall 102a. Cap 108 is replaced and the water is then heated to the appropriate temperature. The internally developed pressure, due to heating, will be sufficient to force the water past the valve 131, as soon as the valve opens and through the tube 133 to the coffee basket.

Since it is desired to have the device function automatically in an on-off operation the electrical heating system, as indicated in FIG. 2, is built into the bottom of the unit and consists of power supply conduit 211, passing through insulator 212, to bring leads 413 and 414, to control unit 215 to provide energy to the two heating rings 121 and 122. The control unit 215 is shown in vertical section in FIG. 2 and partly in FIG. 11, and in detailed plan in FIG. 3. It includes a bimetallic heat responsive element 421, attached at one end to the base plate 113 of the reservoir. A support plate 422 has four upstanding arms 422a welded to the under side of the base plate 113. A switch operating member 423, having a push button 425 at its right-hand end, slides between plates 113 and 422 and, at its left end, carries a latch lever 226, pivoted at 227 (FIG. 11). The right-hand end of lever 226 is connected by a spring 229 to a lug 230, bent upwardly from plate 422. A thickened part 231 of the plate 422 carries two adjustable detents 232 and 233. The lever 226 has at its left-hand end a tapered finger 226a which cooperates with bimetallic element 421 and at its right-hand end a finger 226b which cooperates with detents 232 and 233. The switch operating member 422 carries cams 243 and 244 (FIG. 3), which operate movable contacts 235 and 236, cooperating respectively with relatively stationary contacts 234 and 237. When the switch operating member 423 is moved to its extreme left-hand position, finger 226b engages detent 232, cam 243 closes contacts 236 and 237 and cam 244 closes contacts 234 and 235.

When the water reaches infusion temperature, bimetallic element 221 moves finger 226a, rotating lever 226 counterclockwise enough to lift finger 226b upward off detent 232. Spring 229 then moves the switch operating member 423 to the right and rotates lever 226 clockwise to engage detent 233. In this position of member 423, contacts 234, 235, remain closed, but contacts 236, 237 are open. The member 423 holds that position until the water reaches a still higher temperature, at which bimetallic element 221 again engages finger 226a and rotates lever 226 counterclockwise to lift finger 226b off detent 233, whereupon spring 229 returns member 423 to its off position.

Figure 7A:
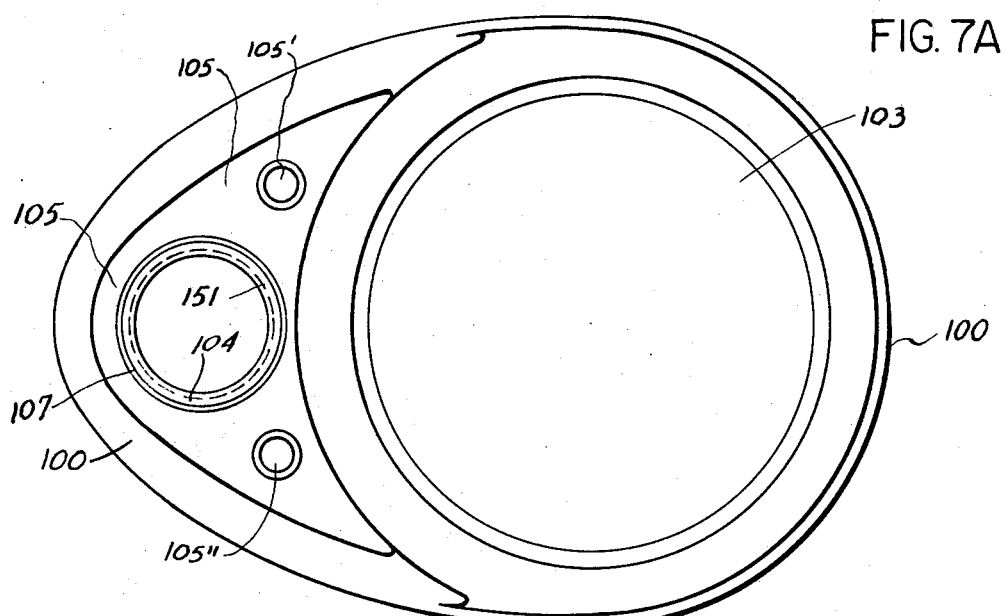
FIG. 7A is a top plan view of the base structure, with the overlying parts removed.

In FIG. 7A, it might be seen that the base 100 has an arcuate periphery at its right end, merging tangentially with an elliptical periphery at the left-hand end. The upstanding section 104 supports the tubular member 151. The ledge 105 extends between the upstanding section 104 and the elliptical periphery of the base 100. Two openings 105' and 105" are provided in the ledge 105. These openings are matched by similar openings molded in the head 109, and provide a means for fastening the head securely onto the base. This is accomplished by the structure shown in FIGS. 9 and 10.

In FIG. 10, which is a section vertically through the fastening, head piece 109, and ledge 105 are shown as fastened by a bolt 251 and nut 255, cooperating with washers 252 and 253, and an O-ring 254, to form a pressure liquid-tight joint when the nut 255 is fastened into place.

The opening 105' and 105" are made symmetrical because the opening 105" as shown in FIG. 9, serves as a passage for the water tube 133, from the base up through the hollow space, through opening 105" and therefrom into the head and coffee infusor. The head 109 and ledge 105 are fastened together by a bushing 261, a gasket 263, and a nut 264, to compress an O-ring seal 265, and form a watertight joint. It is important to observe that the water reservoir in the base of the instrument, from base plate 113 to the ledge 105, is a single unitary compartment within which the water is heated and vapor pressure generated. Thus, the head 109 is securely and stably fastened in place on two sides of the upstanding section 104. By providing the watertight and moderately pressure-tight joints, it is possible to heat the water in the reservoir and thereby develop sufficient pressure to drive it through the tube. A moderate amount of vapor space above the water level is needed to act as a pressure accumulator, thereby storing vapor pressure energy during the heating cycle.

Figure 7:
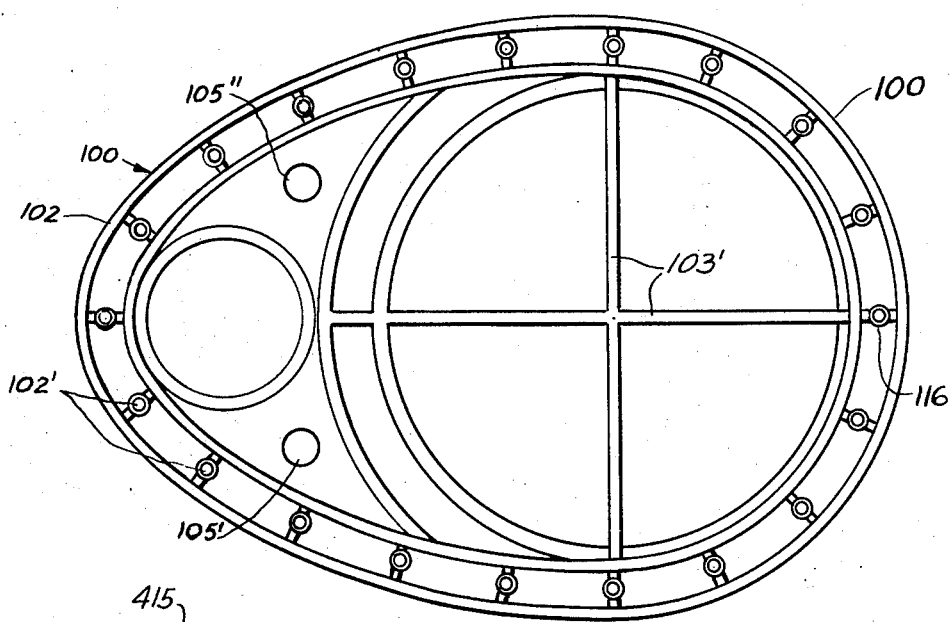
FIG. 7 is a bottom plan showing the base structure.

FIG. 7 shows the structure of base 100. A sequence of bosses 102' is molded between the skirt 102 and the wall 102a. By providing a sufficient number of these bosses, adequate connection is made for securely holding the bottom 113 in place when it is fitted to the edge of the wall 102a and tightened in place by the sequence of screws indicated as 116, 117 (FIG. 2).

In FIG. 6, and in FIG. 4, I have shown, respectively, a plan and sectional view of the single molded piece which serves as the head 109 on which is carried the coffee basket 191 (FIGS. 2 and 6A). Thus the head 109, as a single molded piece, is shown with the cylindrical supporting left end and slightly tapered outer surface, together with the basket-carrying potion, having the inwardly sloping curved surface 182.

The curved surface 182 has a sequence of apertures therein 261, 262, 263, 264, 265, 266, 267, and 268, around its circumference. These apertures are molded to provide a point of ingress for the lugs on the coffee basket and by means of a quick one-eighth turn, the lugs of the coffee basket ride up cam surfaces at 271, 272, 273, 274, 275, 276, 277, and 278, to form a firmly engaged joint, thereby compressing gasket 185 and sealing head 109 to coffee basket 191 as shown in FIG. 2.

Dimensionally, these apertures and cam surfaces can be molded to a fine degree of tolerance as can be the lugs on the coffee basket. Hence, in providing entry for the lugs the curved surface 182 provides a guide, and when the user feels the coffee basket enter the unit, a quick turn in the direction indicated, actually a one-eighth turn, fastens the basket firmly in place.

Under a given constant pressure, such as will be developed in the water receptacle when the water is heated to 195°F. it is important that the water pass through the coffee grounds in an approximately fixed or prefixed period of time, e.g., about three minutes. With a small volume of coffee grounds and a small volume of water, it is desirable to vary the size of the opening because all other variables have been fixed by the apparatus. FIG. 5, the bottom 213, on the coffee basket is shown enlarged.

DETAILED DESCRIPTION OF THE CIRCUIT

In FIG. 8 I have illustrated in semi-pictorial form the circuit which is employed for the two levels of heating in the water heating chamber.

Figure 3:
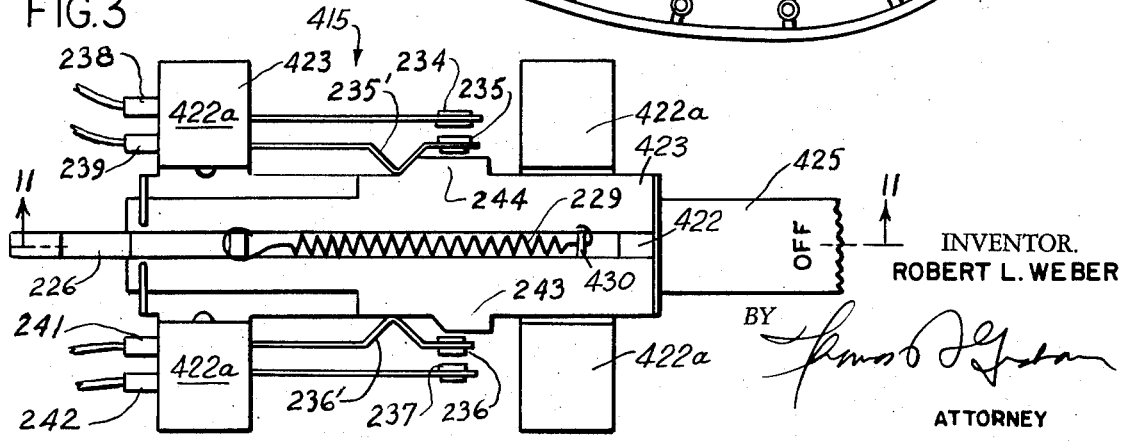
FIG. 3 is a plan view of the main switch of the apparatus through which the sequence of operations is controlled.

For coordinating FIG. 8 with FIG. 3 and FIG. 2, where the pictorial representations of the switch and the heater in place are shown, I have used identification numbers on the circuit of FIG. 8 to correspond with parts in FIGS. 3 and 2. Thus, the circuit consists of a two-level heating circuit in which power is supplied by line 211 with a branch consisting of line 238 to heating coil 122, high level, generally for an eight-cup infusor 1150 watts, lead 239 to switch contacts 234 and 235. The parallel coil consituting the low-level heating, for example, 350 watts is fed by line 240, to heating coil 121, with return by line 241, switch 236 and 237.

Shown diagramatically, in this circuit, is the switch 425 with the cams 243 and 244 diagramatically related to these switches to correspond to points 234, 235, and 236, 237 of FIG. 3. When the switch 225 is moed forward to its most forward point so that finger 226b engages detent 232 (FIG. 11), both switches 236 237, and 234, 235 are closed and heating of the water in the infusor with both circuits in total of approximately 1,500 watts is in effect. When a predetermined temperature is reached, bimetallic element 221 engages finger 226a and rotates lever 226, moving finger 226b off detent 232 from which position it moves to detent 233 and is there held. When finger 226b moves off detent 232, the circuit to the high-level heater, namely the 1,150 watt or the circuit 122, is opened at contacts 234, 235 and the heat supply holds at the 350 watt level which is sufficient to maintain temperature and to generate the additional vapor needed to move the whole body of water to the infusor.

After the water level drops to the small amount left in the reservoir 113', being heated by heater 121, the temperature is raised further to cause the bimetallic element 221, again, to engage feeler 226a and rotate lever 226, moving finger 226 b off detent 233 and causing the switch to drop back to the off position. In this manner the heating of the water is completed; the water is driven through the infusion cup, and upon completion of the operation the device shuts itself off.

FIGS. 12–17

Referring now to FIG. 12 it will be apparent from the section that the overall structure of the device and combination there shown corresponds to that in FIG. 2. The modifications making this the preferred version are in the improved infusion chamber, which provides for a constant residence time of water in the chamber, whether the amount of coffee being made be four, six or eight cups; an improved top for the column to close the water vessel, which incorporates a safety valve; and improved water release mechanism in the base.

The method of brewing coffee requires the accompanying switch mechanism to be sharply temperature responsive so that the high intensity heat used to bring the water up to infusion temperature can be dropped to a lower intensity to maintain the water temperature for discharge. It can further provide for a heating circuit in the base of the appliance under the coffee receptacle.

For convenience in reference and identifying parts, the numerals used in FIG. 2 identifying the basic parts of the apparatus have been carried over to FIG. 12. The details of modifications are shown by the adoption of a new sequence of numbers in reference to the modified part:

In the column 104, filter tube 151 is centered by ribs 106' spaced on quadrants and at its top is flared to rest on the ribs below the cap 108.

For purposes of developing a constant residence time of hot water in the coffee infusion chamber I have found it preferable to utilize the modified basket as shown in FIG. 12, wherein the top 183 has a modified molded central bushing 250 having a side inlet 451 threaded to receive a water tube 452, which here is shown terminating in a small nipple 453, which makes connection with the vertical through a flexible elbow 133''. The details of this connection are shown in FIG. 19.

Centrally in the bushing 250 there is molded a nipple 454, which is threaded to receive screw 455, the nipple being central in the bushing 250 to define a circular torus-like orifice 256. Fastened to nipple 454 by the screw 455 is the water spreader plate 257, which is a metal disk carrying perforations spread over the entire area of infusion. The perforations should be sparse near the center to be sure to develop spreading of water to the periphery. This spreader plate 257 is fitted within the downwardly depending skirt 184, which is slightly undercut to provide a snap fit for the spreader plate. A further securing of the spreader plate can be obtained by fitting a split ring 258 within the undercut groove.

The coffee basket which forms the infusion chamber consists of the straight sided cylindrical unit 260, having a conical bottom 461 terminating in the central orifice 262 with a set of internal integrally molded bottom fins 263, the number to suit the designer but generally, eight. These are to assist in developing easy passage of the fresh coffee infusion.

The radially spaced fins are also suitable to support the screen filter 464 which also serves as a support for a filter paper 465 on its upper face. Three internal interchangeable adapters for setting the amount of coffee grounds to match the volume of coffee infusion to be made are provided. Thus the adapter 266 shown in full section, has a vertical height which defines the volume for coffee grounds and terminates with an outwardly flared portion 267 and an upwardly directed circumferential rim 268, which just fits within the receptacle 260, to be received within the annulus 185 defined by the downwardly depending skirt 184, and form a water tight joint against the gasket 269.

Insert 271 has the same form but is of greater diameter. Inserts like this serve to define the volume of grounds to be used within the infusion portion of the device and at the bottom circumference to form a close fit against the filter paper 265 and screen 264 to provide a water seal. At the top, the water distribution is through the tube 252 to strike spreader plate 257, which spreads the water in a pattern throughout the entire area of the top causing it to submerge the coffee grounds and keep them submerged in water, shielded from air during the infusion, without the inducing the formation of channels in the bed of coffee grounds.

The exact volume of coffee to be made with the adapters, depends upon the actual size of the appliance to be used. For convenience and as an estimate of a reasonable size for use in ordinary domestic applications I have found that the four cup and six cup inserts are useful with a coffee infusion chamber which has a maximum design for eight cups without an adapter.

The insert which fits within the infusion chamber 260 serves the function of holding the filter paper and screen in close juxtaposition in the bottom of the infusion chamber when full capacity is being brewed.

A cover plate 113'' to cover all parts is fitted within the inner periphery of base 100'', a snap fit being useful.

The heating mechanism and water discharge in this embodiment are centered around the formation of the valve, which is best inspected from the discharge tube 133 which in this instance terminates in a flared end nipple 133'. The valve, shown in section in FIG. 14, consists of a valve casing 300 having formed therein holes such as 301, 302, and 303 to provide for discharge of water. The valve casing is flared outwardly to a disk 305 which has a threaded edge 306 which is threaded into a bushing 307 fixed in the depression 113' in the bottom of the container. As shown in section in FIG. 14, the valve body 312 has vanes 308, set at right angles to each other, and integrally molded, preferably for example of Teflon, with the body 312, which seats against a shoulder on the casing 300. A bellows 313 is also integrally molded with the valve body 312. The bellows is angularly flared to form flange 314, as shown, and fitted against a shoulder 315 of the valve body and fastened in place by ring 316. Bimetallic disk 317 is held centered by the adjusting screw 318 and lock nut 319 and fastened in place in an undercut groove of the valve casing by a splint ring 317a.

The valve casing 300 is fitted into the flared nipple 133' of the discharge tube and the seal is formed by the O-ring 300a.

The bimetallic disk may be any combination of metals which will develop the movement desired. Stainless steel clad with copper is suitable and with adequate dimensioning, change in direction of curvature can be had at a closely determined temperature.

The purpose of this construction is to give the valve body the longitudinal movement to open and close it. The bimetallic disk senses the hot water and by differential expansion at a given temperature will snap the valve open downwardly by the buckling of the curvature of the disk. The autogeneous pressure within the closed chamber will force discharge of water through the tube 313. The movement of the screw 318, which is also an adjusting calibrating screw, is employed to actuate a switch in the electric heating circuit, through any desired mechanical arrangement. One arrangement has been shown in connection with FIG. 2. The preferred arrangement shown herewith is like that in FIG. 2, built to provide a heating at an intense level to bring the water up to temperature and a second stage of heating at a lower level to hold the water at temperature to push it up to the infusor. If desired a third level can be provided to keep the coffee warm in the receptacle.

For a mechanism useful for controlling the heater circuit, reference may be had to FIGS. 13, 14, 15. Thus, the external thumb operated push button segments 320, 321 (FIG. 12) which for purposes of convenience can be semicylindrical in form are enclosed within the tubular support 322 which carries the bracket supports 323, and 324 to permit mounting it on the base of the water heating chamber by a spot welding operation. A cylindrical barrel 325 carrying eccentric cam 326 to provide for selection of a four cup, six cup or eight cup heating intensity circuit is indicated. Connection to the circuit can be made by any conventional means. The mechanical manipulation of the switches is partly by means of the thermally responsive bimetallic disk 317 and partly by the bimetallic actuator 327, which for purposes of fine control can be made of two different bimetallic elements fastened together by a pin 328. The function of this mechanism is to develop a certain movement and whatever combination of bimetallic elements develops that movement will serve the purpose.

This mechanism is illustrated in the detailed FIG. 14 wherein the bimetallic element 327 is shown, with the thermally responsive disk 317 in section and the screw 318 is operative relation to the switch device.

The switch mechanism thus consists of the two manually operable push button segments 320 and 321 which are of different lengths and have end slots which individually actuate the moving parts of the switch mechanism. Thus segment 322 actuates an upstanding arm 330 which is insulated by plastic sleeve 331 (FIG. 14) from the switch contact 332, which it operates. Similarly, push button segment 321 actuates the upstanding arm 335 and operates contacts 336 and 337.

The switch contacts 332, 333, 334, 336 and 337 and their supporting figures are insulatingingly mounted on a support 340 shown in FIGS. 13 and 14. The upstanding arm 330 is a part of a slide shown in FIG. 14a, having an upper horizontal portion 341, a middle horizontal portion 342 fitting under the support 340 and a lower horizontal portion 343 which extends under the screw head 318 actuated by the thermally responsive bimetallic disk 317. A finger 334 is bent downwardly from the middle horizontal portion 342 of this main heater slide. Spring 345 (FIG. 15) has one end fixed on the end of an arm 346 of the support 340 and its opposite end is caught under the finger 344 on the main heater slide. The spring 345 biases the main heater slide to a position in which the step between slide portions 342 and 341 is held tightly against the edge of an opening in the support 340. In this position of the main heater slide, which is shown in FIG. 13, all the switches are open.

The second switch slide (FIG. 14b) for the auxiliary heater is formed with the upstanding arm 335, and a horizontal section 351 extends under the support 340, terminating in an arcuate bend 352, which serves as a spring, and in which adjusting screw 353 is set.

For convenience in and clarity of understanding the operation and construction of the device the outlet valve 300 of FIG. 12 has been positioned in FIG. 14 in enlarged section and operative relation to the switch slide structure.

The slide operated by arm 330 is mounted on the support 340, which support has openings 360 and 361 to permit movement of the slide parts therein. The support 340 carries a detent pin 362 placed to engage a knife-edged opening 363 in slide portion 342. Similarly, the slide 351 which is shown in reduced perspective in FIG. 14b has an opening 37 stamped therein and provided with a knife-edge to engage a detent 371.

In operation the main heater push button segments 320 and 321 are manually pushed inward, the total motion for a full scale domestic appliance being approximately one-fourth inch with the result that the segments exert horizontal forces on the arms 330 and 335 moving the two slides to the left, closing the electrical contacts to bring about heating of the water in the reservoir. The openings in the respective slides engage the respective detents 362 and 371 and the contacts are held closed. When the appropriate temperature of the water is reached in the base of the container, the bimetallic snap disk on the valve 300 senses the temperature, snaps the valve open and the screw head 318 in a properly adjusted valve will move longitudinally downward, total motion about 0.050 inch, to engage the main heater slide and dislodge it from the detent 362 causing the slide to move back to an off position and opening the circuits completed by switches 334,333,332. The reduced intensity of the heater remains on to keep the water moving and when most of it has been moved out of the heating chamber, or all of it has been moved out, bimetallic element 327 will have reached and moved downward to engage screw 353 to move it and disengage the corresponding knife-edge opening 370 from the detent 371 allowing the auxiliary circuit then to snap to the open position, being moved by a spring 401 corresponding to spring 345.

The relative positions of these parts are shown by reference to FIGS. 13 and 15 which are top elevation and bottom elevation of the switch unit, showing the switch terminals A, B, C, D, and E and their relation to the contacts.

Reference to FIG. 16 will show the electrical circuits connected to A, B, C, D, and E indicating that there are two intensity levels for the circuit, A, B, C, to be selected by the cam on the switch manipulator. In FIG. 16 this is shown as an ordinary 120 volt, AC, 60 cycle, circuit used with two heater branches. I have found 650 watts and 230 watts useful levels. By making line A common to the termainal A, it will be observed that terminals B and C close circuit therewith the main switch slide. The auxiliary switch slide closes circuit D-E. The selector can be in the form of a mechanical selector a manual switch 402 shown in the diagram, with selector positions for four, six and eight cups, the intensity levels which would be desirable for a typical domestic appliance.

FIGS. 12 and 17 show a top 108 having an internal safety valve construction Centrally molded as part of the top 108 is the top opening 375 and a downwardly depending tube 376 having a threaded end in which is fitted a retaining ring 377. The valve insert consists of a pi-section, hollow unit 378 having side vanes 379, 380, running longitudinally along it to guide it in the opening, its bottom extending across substantially the entire diameter of the downwardly depending bushing 376. Its tip is formed of a rubber gasket material 383.

The pi section portion of the valve is urged into close sealing relationship with a seat encircling an orifice 377 by spring 385 which bears against a shoulder in the tube 376. Retained on orifice 386 is the cylindrical stylus 390 having soft (rubber) tips 391 and 392, to permit inserting it either way. The weight of this stylus 390, with its gasket material tips 391, is selected to form a pressure relief valve at the orifice 386 to correspond with the vapor pressure of water at a temperature of just about boiling. Inasmuch as actual discharge from the heating chamber will occur at a temperature just below the boil, in use the stylus 390 will usually chatter slightly in position. This is a preferred form of operation, becuase it indicates appropriate pressure is being reached and maintained in the water heating chamber. In the event of failure of the stylus 390 to lift to relieve pressure, the spring and valve portion around it are set to open, or cause the pi valve to open, at a pressure a few ounces per square inch above the vapor pressure of water at the boiling temperature. This is a safety feature and once the valve lifts against its spring the vapor escapes around the tip around the spring, and out through the orifice 375, and out the top of the unit. The valve face serves to provide a certain blowdown allowing the vapor pressure within the vessel to drop to a safe level before the valve will be reseated by the spring.

The preferred version of the water tube is shown in FIGS. 18 and 19. The water tube is a three piece unit in which the bottom end 133 is flared, bent suitably to bring it to a point to be passed through the ledge 105 to terminate in an upwardly directed open end in the column 104. This end is connected to the water inlet tube 452 of the coffee infusion chamber as indicated in FIG. 19, employing a simple, flexible elbow 133'' with spring clips to make tight joints.

Reference back to FIG. 12 will illustrate an optional form of rest for the coffee receiver which is positioned below the orifice discharge of the infusion chamber. This receiver, generally in the form of a glass or steel pitcher, will rest on the plate and for the convenience of the user it may be desirable to build into the plate a warming coil. Hence, the water heating chamber shown in FIG. 12 has a top 400 with a recess 401 molded therein to receive a coil heater 402. A stainless steel cover 403 is snap fitted in place over this. A temperature sensing element 404 is fitted within a recess 405 molded in the top 400, and covered with a flexible metal shield 406. Electrical leads from the heater 402 and sensing element 404 can be brought through the groove 407 provided therefor, down through the side of the unit for connection into the electrical circuit.

In operation the cycle sought is a quick heating of the body of water to be brought to infusion temperature, a quick release of the valve closure at appropriate infusion temperature, provision of enough space within the water heating chamber to provide a significant volume of vapor and air to expand and provide the driving force for lifting the water through the tube 133 from the valve up through the tube and into the coffee infusion chamber. The coffee infusion chamber is designed preferably to give an optimum infusion time and depth of coffee grounds, these two variables being interrelated. Hence, the water distribution is provided over the bed of coffee grounds, the grounds being of an appropriate depth so that the entire volume may be quickly wetted by the hot water.

Overall in using the circuit for the capacity indicated, for making eight cups of cuffee, I have found that the calibration of the container should be such that a few ounces of water should be allowed for holdup to wet the body of coffee grounds, representing a loss in volume. For eight cups of coffee about 50 to 51 ounces of water are provided this being calculated at 6 ounces per cup, with about 2 to 3 ounces holdup.

The filtering of the water to condition it for preparation of the coffee is by adding it through the top 109, as a consequence of which it percolates down through the column of activated charcoal, which should have a degree of granularity approximately that of ground coffee. Any laboratory grade of activated charcoal is suitable, such as chemists use routinely in laboratory work for decolorizing solutions. Since chlorine and fluorine ions are perhaps the most seriously detrimental ones to the flavor of coffee, and are virtually universally used as water additives, it is important that the filter material be suitable to pick up chlorine and fluorine ions. Beyond this, if the water is very hard and contains large amounts of metal ions provision should be made for removing these. Perhaps an ideal would be deionized water. Hence, synthetic resins of the type used for dionization of water are also useful as a filter material.

Materials of construction for the appliance are fundamentally dicatated by the use to which it is to be put. Bearing in mind that it is to prepare a potable beverage and the temperatures will commonly be of the order of 100°Centigrade of 212° Fahrenheit, and higher in the heating areas, it is important that the materials be suitable for use at this temperature level, with various grades of water, and to withstand the corrosion to which they will thus be subjected. For the body of the device and the formation of all the molded parts, I have found that polycarbonate resins are eminently suitable. A specific resin is one which is manufactured by the General Electric Company and sold under the trademark Noryl 731-S. It has the virtue of having the properties desired and is also approved by the Food and Drug Administration as material which can be used in contact with foods. This latter point, of course, is basic to selecting material which is to be used in the manufacture of the appliance.

For the metal parts of the device, namely, the water heating chamber, the heating coils and the tube which is the conduit, as well as the valve in the enclosure, stainless steel is indicated. Stainless steel compositions of the so called 300 series which have a very fine level of resistance to corrosion are most suitable.

The mechanical parts of the switch mechanism for turning the appliance on and off are ordinary carbon steels, spring steels, appropriately plated and finished where necessary. The copper leads are conventional. The copper contacts are of beryllium spring copper. Insulators are conventional where they are used.

The heating coils used in the body of water or in heat exchange relationship with the water, are of conventional construction, such as used in conventional coffee perculaters, that is, whatever comes in contact with the water must be resistant to chemical reaction with the water. Beyond this, the materials of construction or design are as variable as may be available to the designer.

Since a basic point in the method of making coffee infusion in accordance with this invention involves an appropriate time temperature extraction, the standards of the Coffee Brewing Institute should be kept in mind as to the quantity of coffee and period of time of extraction. The recommended time of extraction is three to four minutes at about 195°F ± 5°. This is variable to suit individual tastes, but this number is accepted. The amount of coffee to be used per six ounce cup is about one-third ounce or 10 grams. Since a cup is accepted to be six liquid ounces the volume of water and hence the volume of water heating chamber is indicated. The heating chamber should be of size that it contain the maximum amount of water for the appliance, namely, about 48 ounches for eight cups and still leave a significant air space above that water for the accumulation of vapor and development of pressure and energy to move water up through the delivery tube, which is five thirty-seconds inch in diameter (0.6–0.8 cm). In heating and brewing coffee with less than the maximum eight cups there will be that much more free volume and the pushing action the expanding air and vapor will be that much easier.

The time of extraction is developed by the rate at which the water is delivered to the infusion basket and the rate at which it can pass through the coffee grounds and run out of the orifice. This is done by regulating the size of the infusion basket to keep the depth of coffee constant at about 1¼–1½ inches in height (3–4 centimeters). The height determines the rate at which the flow occurs and the orifice is made large enough to allow all of the infusion to pass out as it is formed, i.e., about one-fourth inch in diameter (about 0.65 centimeters). The diameter of the basket will vary with the insert used to match the number of cups of infusion to be made.

What is claimed is:

1. A coffee maker comprising in combination, a base, a water heating vessel on said base having an inlet and an outlet, means for heating water in said vessel, means on one portion of the vessel to support a coffee receiver, a column extending upwardly from another portion of the vessel, a coffee infusion chamber supported by the column, means for closing the inlet, a passage through which heated water may be withdrawn from the outlet of the vessel and passed to said infusion chamber through an entrance thereto, a water spreader means disposed across the entrance to said infusion chamber, a thermally responsive valve means controlling said passage for said heated water, said valve means being closed when the water is below a preset temperature and being sharply responsive when the water exceeds said preset temperature to open said valve means and permit water under pressure built up in said vessel by heating of the water therein to pass via said passage to said infusion chamber.

2. A coffee maker comprising a base member, a closable water heating vessel mounted on the base member, a coffee infusion chamber exterior to the water heating vessel and spaced above the base member; water inlet means for the vessel extending therefrom up to at least the top of the coffee infusion chamber; a closure element for said water inlet means; a water flow tube connecting said water heating vessel from a point near the bottom thereof to said coffee infusion chamber; valve means controlling the flow in said tube; means responsive to the temperature in said vessel for operating the valve means, said valve means being closed at normal room temperature; means for heating the water in the vessel to increase the pressure therein when both the closure element and the valve means are closed; said temperature responsive means being effective to open the valve means when the water exceeds a predetermined temperature, so that the water then flows rapidly through the valve means and the tube to the coffee infusion chamber.

3. Coffee making apparatus for heating selective variable quantities of coffeee, comprising a closable pressure-tight water heating chamber, an infusion chamber, a conduit connecting the heating chamber and the infusion chamber, a valve controlling water flow through the conduit, means responsive to the temperature in the heating chamber for operating the valve from a closed position when the water therein is below a predetermined temperature to an open position when the water exceeds said temperature, heating means effective when the chamber is closed to generate pressure in said heating chamber, said pressure being effective when the valve is thereafter opened to urge a measured quantity of heated water from the heating chamber through the infusion chamber, and means to control the flow of heated water through the infusion chamber in accordance with the quantity of coffee to be brewed in order to maintain a constant infusion time.

4. Coffee making apparatus as claimed in claim 3 wherein the means to control the flow of water through the infusion chamber is an adjustable chamber diameter.

5. In a coffee maker appliance of unitary form for brewing a variable quantity of coffee, variable by feed of a variable number of chosen units of volume of water from a heating chamber to an infusion chamber, the combination comprising a base supporting a column, said base and column being in communication and enclosing the heating chamber, said column enclosing a water filter chamber, and the top of said column being closable to seal said column, filter and heating chamber to a pressure-tight condition, a discharge tube communicating with said heating chamber at a low point therein, the entry to said tube being controlled by a thermally responsive valve sharply responsive to a predetermined temperature, a top for said coffee maker comprising a support on said column, carrying a coffee infusion chamber removable therefrom, said coffee infusion chamber being a closed receptacle with an ingress orifice for water from said heating chamber and a discharge orifice, said infusion chamber being of variable diameter to permit variable rates of discharge from said chamber through constant depth of coffee grounds, and heating means in the heating chamber in heat exchange relation with water therein, said heating means being selectively controllable at different levels of intensity.

\* \* \* \* \*